I. J. O'MALLEY.
WATER HEATER.
APPLICATION FILED OCT. 26, 1908.

978,196.

Patented Dec. 13, 1910.
5 SHEETS—SHEET 1.

Witnesses
Harry R. L. White
M. A. Kiddie

Inventor
Ira J. O'Malley
By
Atty

I. J. O'MALLEY.
WATER HEATER.
APPLICATION FILED OCT. 26, 1908.

978,196.

Patented Dec. 13, 1910.

I. J. O'MALLEY.
WATER HEATER.
APPLICATION FILED OCT. 26, 1908.

978,196.

Patented Dec. 13, 1910.
5 SHEETS—SHEET 4.

Witnesses
Harry R. Levite
M. A. Kiddie

Inventor
Ira J. O'Malley
By [signature] Atty.

UNITED STATES PATENT OFFICE.

IRA J. O'MALLEY, OF CHICAGO, ILLINOIS.

WATER-HEATER.

978,196. Specification of Letters Patent. Patented Dec. 13, 1910.

Application filed October 26, 1908. Serial No. 459,456.

*To all whom it may concern:*

Be it known that I, IRA J. O'MALLEY, a citizen of the United States, residing at Chicago, in the county of Cook and State of Illinois, have invented new and useful Improvements in Water-Heaters, of which the following is a specification.

In gas operated water heaters the pilot light is sometimes extinguished by sudden drafts or by a low pressure of gas and an explosion is apt to result when an attempt is made to re-light the pilot burner if the proper precautions are not observed. Sometimes the pilot light burns too low, owing to improper adjustment of the valves, or to low pressure of gas, or to incrustation of the pilot burner, and fails to immediately light the main burners when the gas is turned on, thereby permitting an accumulation of gas in the heater which is finally ignited by the pilot light and with a resulting explosion.

The object of my invention is to automatically shut off the gas from the burners when the pilot light is extinguished and whenever the pilot light burns so low as to cause delayed ignition.

A further object of the invention is to provide a water heater with means normally expanded by heat from the pilot light and adapted to be contracted when said heat is removed by the extinguishment of the pilot light or sufficiently reduced by the pilot light burning low to automatically shut off the gas supply to the burners.

Referring to the drawings.

My invention may be embodied in water heaters of different kinds, such as those known in the trade as automatic instantaneous heaters, automatic circulating heaters and automatic steam and hot water house heaters.

Figure 1:
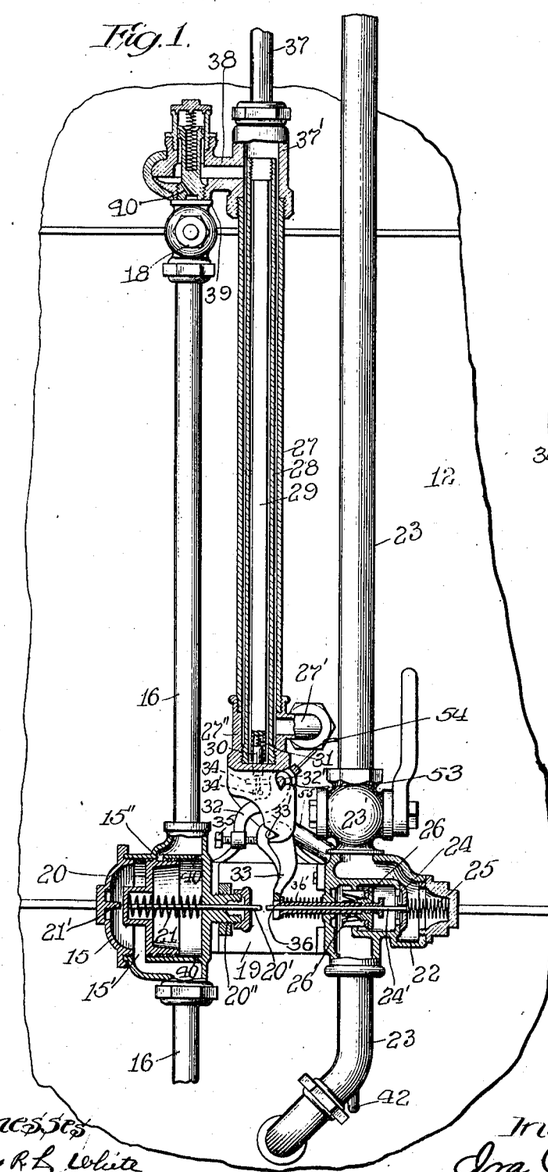
Figure 1 is a sectional elevation showing the thermostat and water and gas valves and a portion of the jacket of one type of heater.

In Figs. 1–11 of the drawings, I have shown the invention embodied in a well-known hot water heater for domestic use and referring thereto 12 is the jacket of the heater which incloses a battery of main gas burners 13 of suitable construction and a superposed water coil 14. A water valve 15 is interposed in the cold water pipe 16 which is connected at 17 to the upper end of the coil and is provided with a cock 18 for regulating the flow of water. The water valve is mounted on a bracket 19 attached to the jacket and it has an inlet port 15', an outlet port 15'' and a plunger 20 (Fig. 1). The stem 20' of the plunger projects through a stuffing box 20'' and a spring 21 is arranged on the stem to hold the plunger normally against the end stop 21' and closing the outlet port 15''. A valve casing 22 is arranged in the gas supply pipe 23 and it contains a main gas valve 24 normally held in closed position by the spring 25, and a thermostat gas valve 26 normally open. The stem 24' of the main gas valve extends through the hollow stem 26' of the thermostat gas valve and both stems project through the valve casing 22 with the stem 24' arranged in opposition to the stem 20' of the water valve and separated a short distance therefrom.

A thermostat comprising an outer tube 27

Figure 2:
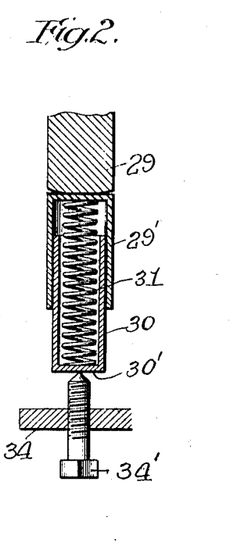
Fig. 2 is a detail enlarged sectional view showing the yielding section in the negative lever of the thermostat.

(Fig. 1) is connected by a branch 27' to the outlet of the hot water coil in the heater, and an expansion tube 28 plugged at its upper end is arranged within the outer tube and screwed into the fitting 27'' at the lower end of the outer tube. A negative lever consisting of a porcelain rod 29 is arranged within the expansion tube and at the lower end of the rod there is a yielding section which takes the place of the usual pin commonly provided and which comprises a sleeve 29' in which another sleeve 30 telescopes. The lower sleeve 30 projects through the bottom of the fitting 27'' and has a closed end 30' which, in effect, constitutes the lower end of rod 29 and engages an adjusting screw 34' on the thermostat lever 32. A strong spring 31 is inclosed within the two sleeves and during the normal operation of the thermostat this spring does not expand or yield but remains rigid to operate the thermostat levers; but the spring is capable of being compressed by the contraction of the expansion and contraction tube to allow the thermostat valve to close. The thermostat levers 32 and 33 have knife edge pivots 32' and 33' which engage bearings on the brackets 19. The lever 32 has a projection 34 which extends beneath the sleeve 30 and the adjusting screw 34' is carried by said projection to engage said sleeve (Fig. 2). Another adjusting screw 35 is carried by the lever 32 to engage the lever 33 (Fig. 1). The stem 24' of the main gas valve projects through the lever 33 but said lever engages a collar 36 on the outer end of stem 26' of the thermostat gas valve and a spring 36' is arranged on the stem 26' between said collar and the gas valve casing.

The upper end of the outer tube 27 of the thermostat is connected with the hot water outlet pipe 37 through the fitting 37'. The cold water pipe 16 is connected by a branch 38 in the fitting 37' with the upper end of the outer tube 27 of the thermostat and a check valve 39 is arranged in this branch. The check valve will close the branch 38 under the pressure of the cold water flowing through pipe 16, when hot water is being drawn from the outlet pipe 32, to admit cold water to the coil, but if no hot water is being drawn from the outlet pipe 32 the check valve remains in the position illustrated in Fig. 1 to permit a circulation through the thermostat and the water coil. This arrangement provides for a circulation of the water in event of the burners remaining lighted when no water is being drawn, and such circulation carries the hot water from the lower end of the coil into the outer tube of the thermostat thereby heating the thermostat and causing the latter to shut off the gas. This result is accomplished by reason of the fact that the inner tube 28 of the thermostat will expand permitting the porcelain rod to rise and as it rises the thermostat lever 32 is permitted to swing to relieve the lever 33 which is pushed to the left in Fig. 1 by the spring 36' until the thermostat gas valve 26 is closed. The check valve and the water valve plunger may be provided with ports 40 so that the cold water supply to the coil will not be entirely shut off when these valves are closed, and this also provides for an expansion of the water in the coil, allowing it to back up in the cold water supply pipe.

The pilot burner 41 (Fig. 7) is supplied with gas through a pipe 42 which is connected with the main gas pipe 23. The pipe 42 has a shut off cock 42' and the main gas pipe 23 has a shut off cock 23'. A gas valve 43 (Fig. 4) for the pilot burner is arranged in the gas pipe 42 and its stem 44 projects upward and is threaded to receive nuts 44'. This valve constitutes the starting valve which is adapted to be shut off automatically and turned on by hand independently of the automatic shut off means; and which is also adapted to automatically release the means by which it is operated manually and automatically revert to position where the automatic shut off means controls its closing. A trigger device is provided for initially opening the pilot burner gas valve and this device comprises a cam 45 (Fig. 5) mounted on a shaft 46 which is carried by a block 47 (Fig. 4) secured rigidly on the stem 44 to move therewith. This cam is arranged to engage an adjustable seat 48 on the casing of the pilot burner gas valve 43, and it is operated by weighted handle 45'.

The expansion and contraction tube 49, preferably provided with fins 49' to increase its radiating surface, is suspended from a tubular bracket 50 which is fastened to the jacket of the heater and discharges the hot air flowing from said tube against the coil in the interior of the heater. The inner end 50' of the bracket is shaped to discharge the hot air downward in the heater at an angle of about 45° for the double purpose of deflecting a down draft in the heater and to prevent condensation from the coil entering the tube. A collar 51 (Fig. 11) is adjustably mounted on the lower end of the tube 49 and it has a knurled flange 52 to facilitate its adjustment and a plurality of notches 52' on its upper side. The pivot 32' of the thermostat lever 32 is extended some distance beyond its bearing on one side of said lever (Fig. 8) and on this extended pivot a rock lever 53 is mounted rigidly. One end of this lever 53 engages the collar 52 and for this purpose it is preferably made in the form of a yoke 53' having two projections 53'' to engage notches 52'. The other end of this lever 53 is made in the form of or carries a spring finger 54 (Fig. 3), which engages the stem 44 between the nuts 44' thereon (Fig. 5) and automatically closes the pilot burner gas valve when the tube contracts. The spring finger is provided to enable the valve 43 to be opened by operating the trigger before the tube 49 has expanded.

A hot air pipe 55 (Fig. 7) is secured in the jacket of the heater and has one end 55' located above the pilot burner and its other end arranged loosely in the lower end of the tube 49. I prefer to cover the pipe 55 with some insulating material 55" to protect it from the heat of the main burners.

Figures 3, 4, 5, 6:
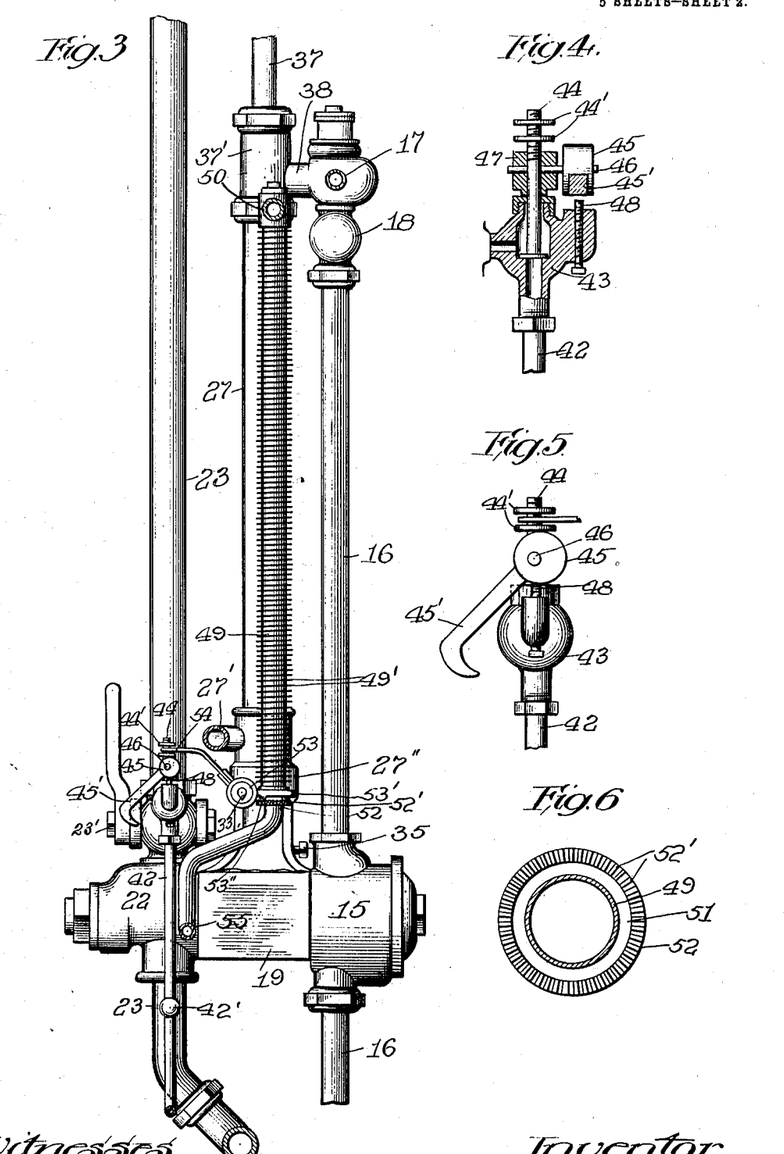
Fig. 3 is an elevation of the invention on the side opposite to that illustrated in Fig. 1.
Fig. 4 is an enlarged sectional detail view of the automatic gas valve for the pilot burner.
Fig. 5 is a detail elevation of the hand operated trigger device for initially opening the pilot burner gas valve.
Fig. 6 is a sectional view on the line 6—6 of Fig. 11.
Figures 7, 8, 9, 10, 11:
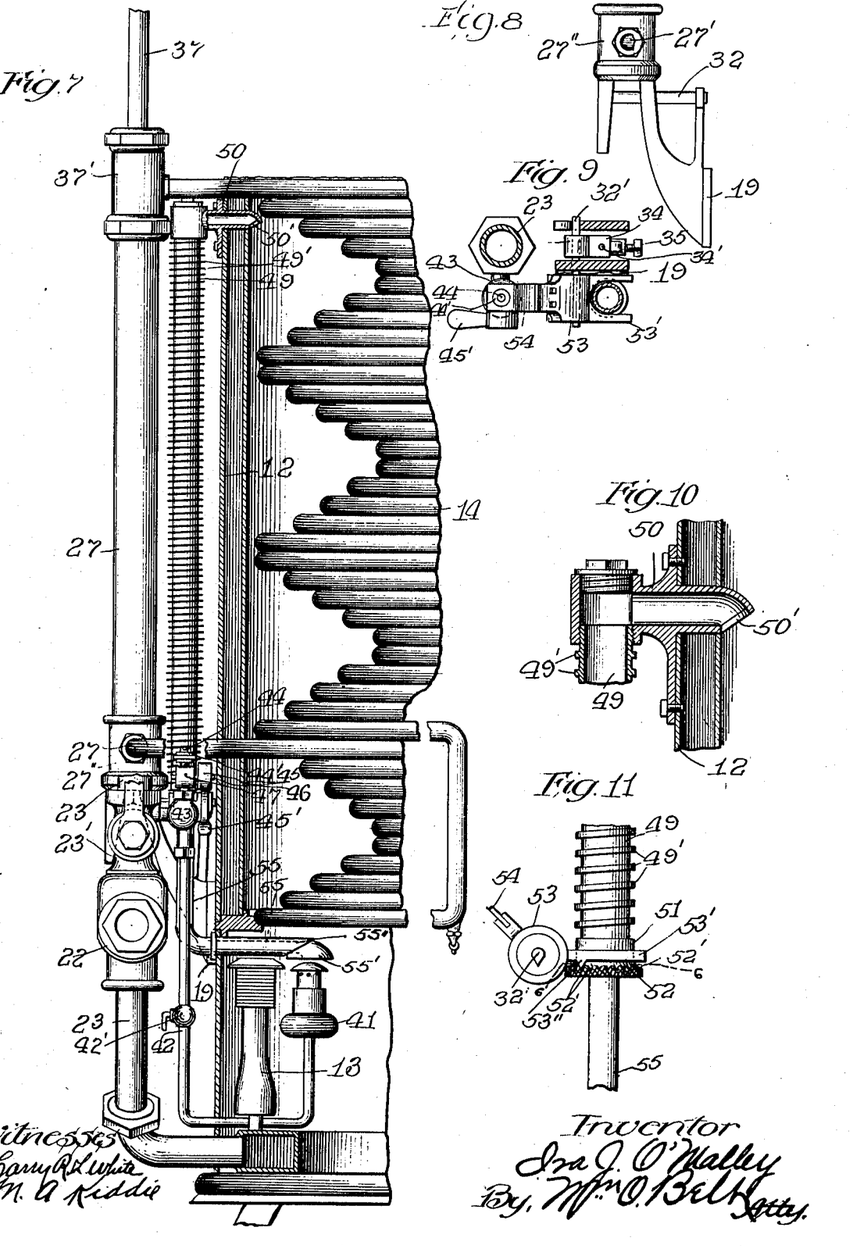
Fig. 7 is an elevation at a right angle to the elevation shown in Fig. 3, and partly in section.
Fig. 8 is a detail view of the bracket.
Fig. 9 is a detail plan view, partly in section, showing the spring finger for operating the pilot burner gas valve and other parts.
Fig. 10 is a sectional view showing the connection of the contraction tube with the heater.
Fig. 11 is a detail elevation of the lower end of the contraction tube and showing also the lever which is operated thereby.

Let it be assumed that the heater is in condition for use, the coil supplied with water, and the water valve, the main gas valve and the pilot burner gas valve closed. The weighted handle 45' of the trigger is raised and the cam 45 bearing on the seat 48 lifts the stem 44 and opens the pilot burner gas valve to permit a sufficient flow of gas to the pilot burner so that it can be lighted. The handle will remain in its elevated position by reason of the frictional engagement of the cam with its seat and the heated air from the pilot light will flow through the pipe 55 into the tube 49 and thence into the heater. The tube 49 will become heated by the hot air flowing therethrough and gradually expand downward. As the collar 51 moves downward the yoke 53' will follow it, being held against the collar and pushed down by spring 31 which presses on projection 34 and turns pivot 32' to swing lever 53 and cause the spring finger to open the pilot burner gas valve to its limit which raises the cam 45 off of its seat and allows the weighted handle to drop down to normal position, as shown in Fig. 5. The heater is then in operative condition with the pilot burner lighted. If water is drawn at a faucet from the hot water pipe 37 the pressure within the coil will be relieved accordingly and the pressure of the cold water will force back the plunger 20 and close the check valve 39, thus closing the connection between the thermostat and the cold water inlet to the coil. When the plunger is moved, by the pressure of the cold water, to the right in Fig. 1, its stem 20' will engage and move the stem 24' of the main gas valve 24 to open said valve, thereby admitting gas to the main burners which are immediately lighted from the pilot burner. When the drawing off of hot water ceases the plunger 20 is moved to the left in Fig. 1 by the spring 21 to close the outlet port 15" and permit the main gas valve to be closed by the spring 25 thereby shutting off gas from the main burners. At the same time the check valve 39 will open. If the hot water is drawn off slowly or if the water in the coil reaches a temperature exceeding the predetermined degree the thermostat will operate in a well-known manner to permit the lower end of the lever 23 to be forced to the left in Fig. 1 by spring 36' to close the valve 26 which shuts off the supply of gas from the main burners. This thermostat gas valve is normally open, as shown in Fig. 1, and is automatically closed, as before stated, when the water is heated to the predetermined degree.

If the pilot light is extinguished accidentally, or if it is caused to burn too low, as heretofore mentioned, the tube 49 will cool off and contract, thereby raising the collar 51 and swinging the rock lever 53 to cause its spring finger to close the pilot burner gas valve and at the same time move the thermostat lever 32 against the pressure of spring 31 to permit spring 36' to close the thermostat gas valve. Thus the pilot light will be extinguished, and, the thermostat valve being closed, no gas can be admitted to either the main burner or the pilot burner, and hence all danger of explosion is removed. The spring pressed sleeve 30 provides an end for the porcelain rod 29, to engage the adjusting screw 34', which will yield under the pressure of the rock lever, when the tube 49 contracts, so that the thermostat levers are operated independently of the thermostat. In the normal operation of the heater a clearance between the yoke 53' and flange 42 will constantly be maintained because the tube 49 will be heated to a higher degree than the thermostat inner tube and expand correspondingly.

Figure 12:
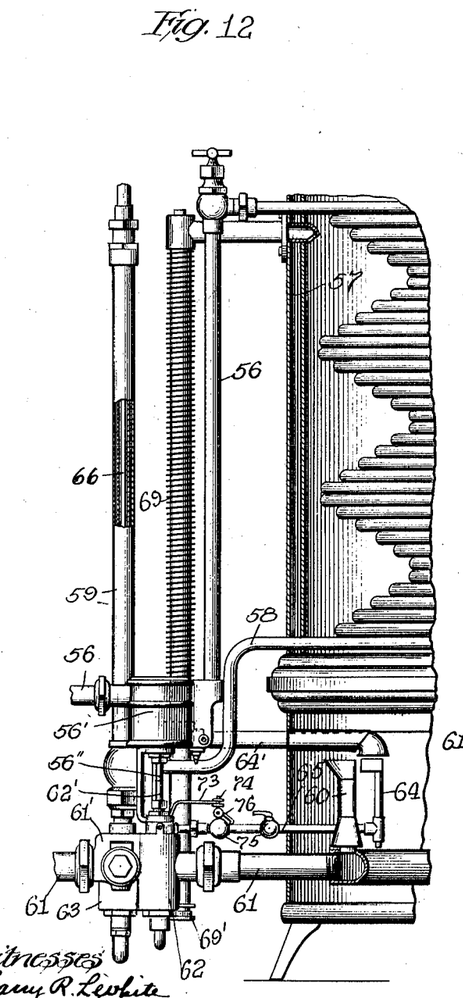
Fig. 12 shows the invention embodied in another type of heater in which the thermostat levers are inclosed in a casing.
Figure 13:
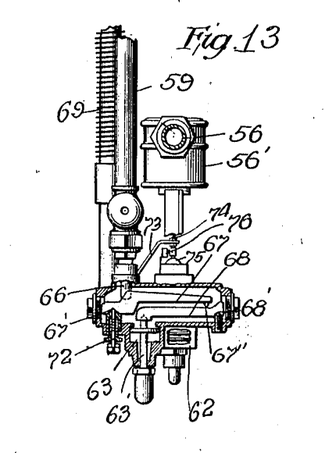
Fig. 13 is a detail sectional view showing the thermostat levers of the heater illustrated in Fig. 12.
Figure 14:
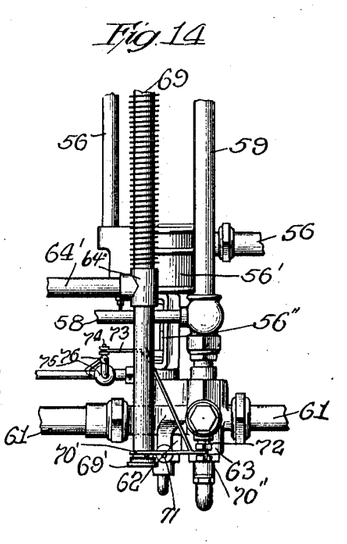
Fig. 14 is a detail elevation showing the side of the mechanism opposite that illustrated in Fig. 12.

In the heater illustrated in Figs. 12-14 the cold water pipe 56 is provided with a water valve 56' and is connected to the upper end of a coil inclosed within the jacket 57. The lower end of the coil is connected by a pipe 58 to the lower end of the thermostat 59 through which the hot water passes to the service pipe. The main burners 60 are supplied with gas through a pipe 61 in which are located the main gas valve 62 and the thermostat gas valve 63. The pilot burner 64 is supplied with gas through a pipe 65 which receives gas from the main pipe 61 and is tapped into the casing 61' inclosing the main and thermostat gas valves. A hot air pipe 64' having one end above the pilot burner is arranged to discharge at its other end into the tube 69 through a loose fitting 64" on said tube (Fig. 14). The rod 66 of the thermostat engages the upper thermostat lever 67 (Fig. 13) which is fulcrumed at one end on the movable knife edge 67'. The upper thermostat lever is provided with a stud 67" which engages the lower thermostat lever 68 and this latter lever is fulcrumed at one end on the fixed knife edge 68' and at its other end engages the stem 63' of the thermostat gas valve 63. The stem 56" of the water alve is arranged to engage and operate the stem 62' of the main gas valve in substanially the manner heretofore described. The xpansion and contraction tube 69 is supported from the heater in the manner heretofore described and is provided at its lower end with the collar 69'. A rock lever 70 is pivoted on the knife edges 71 and is engaged at one end 70' with the collar 69' and at its other end 70'' with a spring-pressed pin 72, on the upper end of which is the knife edge 7' forming the fulcrum for the upper thermostat lever 67.

A spring finger 73 on the lever 70 engages the stem 74 of the pilot burner gas valve 75 in the gas supply pipe 65 to the pilot burner. The same trigger device 76 heretofore described (and shown more particularly in Fig. 5) is provided for initially opening the pilot burner gas valve.

It will be readily understood, in view of the full operation of the invention heretofore explained, that when the tube 69 contracts by reason of the extinguishment of the pilot light or because it burns too low, the rock lever 70 will be swung on its fulcrum and thereby pull the fulcrum 67' of the upper thermostat lever 67 down (away from the thermostat rod 66) and sufficiently to permit the thermostat gas valve to close under the pressure of its spring. At the same time the spring finger 73 will close the pilot burner gas valve 75. To re-light the pilot burner the trigger 76 is operated to open the pilot burner gas valve 75 and soon the heat generated by the pilot light will cause the tube 56 to expand thereby permitting the spring-pressed pin 72 to readjust itself to proper position to form a fulcrum for the thermostat lever 67 in the normal operation of the device.

Figures 15, 16, 17:
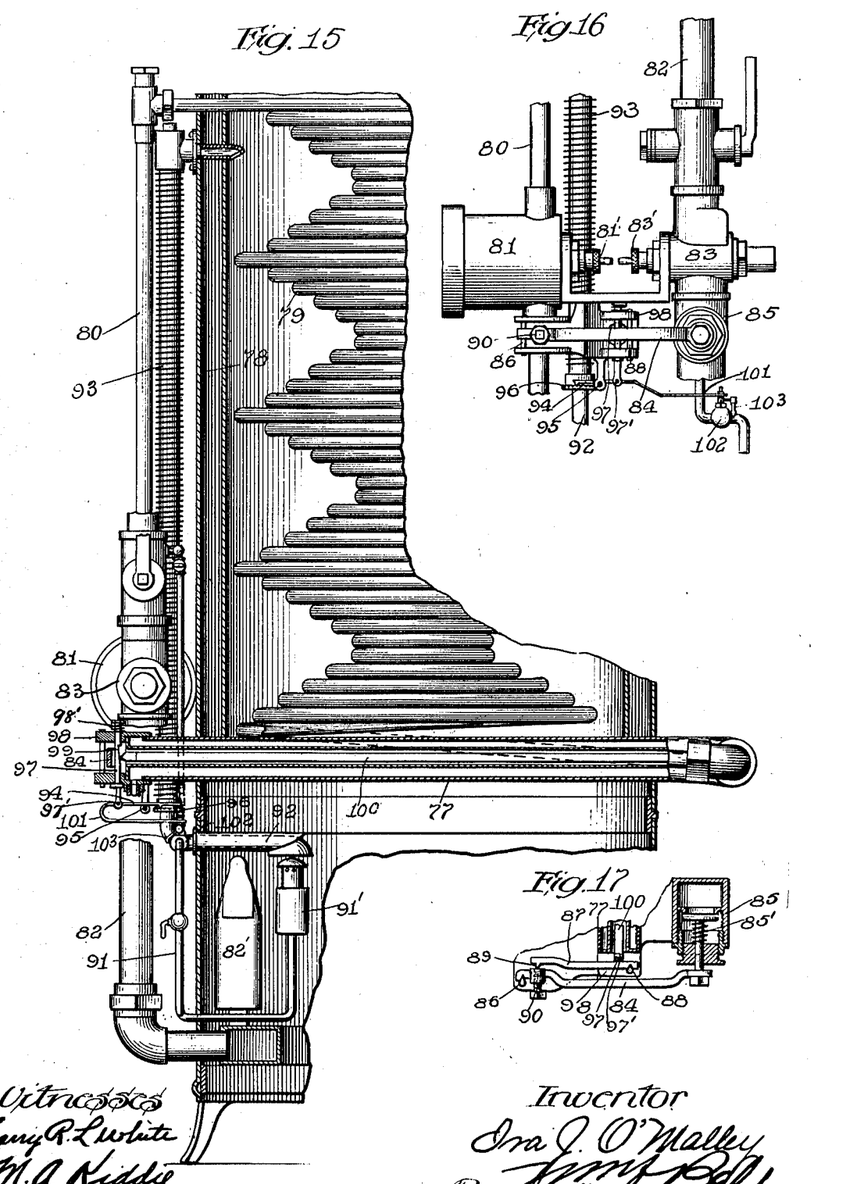
Fig. 15 is a sectional view showing the invention embodied in another type of heater in which the thermostat is arranged horizontally within the heater.
Fig. 16 is a detail elevation at a right angle to Fig. 15.
Fig. 17 is a detail sectional view showing the thermostat levers of the construction shown in Fig. 15.

In Figs. 15-17 I have shown the invention embodied in another well-known type of heater in which the thermostat 77 is located within the jacket 78 of the heater and below the coil 79. The coil is connected at its upper end with a cold water pipe 80 and at its lower end with the thermostat. The cold water pipe 80 has a water valve 81 and the gas pipe 82 has a main gas valve 83, the stems 81' and 83' of the water valve and the main gas valve being arranged in opposition to each other in the same manner illustrated in Fig. 1. The thermostat lever 84 is connected with and operates the thermostat gas valve 85, and this lever is fulcrumed on a knife edge 86. The other thermostat lever 87 is fulcrumed at one end on a knife edge 88 and its other end is provided with a knife edge 89 which engages the upper end of a screw 90 adjustably mounted in the lever 84. The gas pipe 82 leads to the main burners 82' and a pipe 91 is tapped into the pipe 82 and leads to the pilot burner 91'. A hot air pipe 92 has one end arranged above the pilot burner and its other end enters the expansion and contraction tube 93 which is mounted on the jacket in or about the manner heretofore described. A rock lever 94 is pivoted on a round bearing 95 and one end engages the collar 96 on the lower end of tube 93 and its other end is pivotally connected to a slide bar 97 at 97'. This slide bar operates in the casting 98 and is made substantially wedge-shaped at 99 where it engages the porcelain rod 100 of the thermostat. A spring 98' on bar 97 tends to hold this bar up in the position shown in Fig. 15. A spring finger 101 is fastened to the lever 94 at 97' and it engages the stem 80 of the pilot burner gas valve 102 located in the pipe 91 and provided with a trigger 103 as heretofore described.

When the pilot light is extinguished or reduced to such an extent that the tube 93 will contract, the lever 94 is swung on its fulcrum to pull downward the wedge 97 so that there will be sufficient play between the rod 100 and the thermostat lever 87 to permit said lever to swing and enable the other thermostat lever 84 to swing under the influence of the spring 85' to close the thermostat gas valve 85. The spring finger operates the pilot burner gas valve and the trigger on the latter operates in the manner heretofore described.

I have shown the invention embodied in three different forms of heater which differ more or less in construction but in each instance the means for shutting off the gas supply is controlled by the contraction of a tube which is normally expanded by the heat from the pilot burner.

My invention comprises an automatic device of simple character which can be readily applied to hot water heaters of different kinds, and it may be used in connection with a thermostat as herein described or without the thermostat. It insures the shutting off of the gas supply from the burners whenever the pilot light is extinguished and thereby entirely avoids the danger of explosion which may result when an attempt is made to relight the pilot burner after gas has been escaping therefrom and accumulating in the heater. The invention also avoids the danger of explosion from delayed ignition of the main burners.

What I claim and desire to secure by Letters Patent is:

1. In a water heater, the combination of an intermittently and automatically operated main burner, means for supplying gas thereto, means operated by contraction to automatically shut off the gas supply from the main burner, and operated by expansion to automatically turn on the gas supply to said burner, a pilot burner, means for supplying gas thereto, a starting valve positioned in the means for supplying gas to the pilot burner, means for automatically closing the starting valve, and a manual device for opening said valve only, whereby gas may be admitted to the pilot burner without permitting gas to flow to the main burners.

2. In a water heater, the combination of a main burner, means for supplying gas thereto, a pilot burner, means for supplying gas to said pilot burner, a thermostat, a thermostat valve disposed in the means for supplying gas to the main burner, a starting valve disposed in the means for supplying gas to the pilot burner, and connections between the thermostat and said starting and thermostat valves, whereby both of said valves are closed upon contraction of the thermostat.

3. In a water heater, the combination of a main burner, a pilot burner, means for supplying gas to the main burner, a thermostat valve located in said gas supplying means, means for supplying gas to the pilot burner, a starting valve located in said pilot burner gas supplying means, a thermostat, a connection between said thermostat and thermostat valve for controlling the operation of said valve, and a yielding connection between said thermostat and the starting valve adapted to close said starting valve upon contraction of the thermostat but permitting said starting valve to be opened without affecting the thermostat valve.

4. In a water heater, the combination of a main burner, means for supplying gas thereto, a pilot burner, means for supplying gas to said pilot burner disposed in the main burner gas supplying means, a starting valve disposed in the pilot burner gas supplying means, a thermostat, connections between both of said valves and the thermostat, whereby said valves are closed upon contraction of the thermostat, and manual means for opening said starting valve to admit gas to the pilot burner, the connection between the starting valve and the thermostat permitting said valve to be opened without affecting the thermostat valve.

5. In a water heater, the combination of an intermittently and automatically operated main burner and a relatively continuously lighted pilot burner, separate means for supplying gas to said pilot and main burners, a thermostat valve controlling the supply of gas to the main burners, a starting valve for shutting off the supply of gas to the pilot burner, a device normally expanded by heat from the pilot light and adapted to contract when said heat is reduced beyond a predetermined degree to automatically close said thermostat and starting valves, and manual means for opening said starting valve without effecting the position of the thermostat valve.

6. In a water heater, the combination of an intermittently and automatically operated main burner and a relatively continuously lighted pilot burner, gas supply pipes to said burners, a starting valve in the gas supply pipe to the pilot burner, means for automatically closing said valve, manually operated means for initially opening said valve, and means independent of said manually operated means for holding said valve open while the manually operated means returns to initial position.

7. In a water heater, the combination of an intermittently and automatically operated main burner and a relatively continuously lighted pilot burner, gas supply pipes to said burners, a starting valve in the gas supply pipe to the pilot burner, manually operated means for opening said valve, said means comprising a friction device adapted to hold said valve open temporarily, and a weighted handle to return said means to initial position, and means independent of said manually operated means for sustaining said valve in open position.

8. In a water heater, the combination of an intermittently and automatically operated main burner and a relatively continuously lighted pilot burner, gas supply pipes to said burners, a starting valve in the gas supply pipe to the pilot burner, means for opening said starting valve comprising a friction device to temporarily sustain the starting valve in open position, an expansion and contraction tube normally subjected to heat from the pilot light and adapted to contract when said heat is reduced beyond a predetermined degree, a lever connected to the starting valve and operated by said expansion and contraction tube to sustain the starting valve in open position when said tube is expanded, and a weighted handle on the friction device to return said friction device to initial position when the starting valve is sustained in open position by said tube and lever, whereby said starting valve may then be automatically closed by the contraction of said tube.

9. In a water heater, the combination of an intermittently and automatically operated main burner and a relatively continuously lighted pilot burner, gas supply pipes to said burners, a starting valve in the gas supply pipe to the pilot burner, a stem for said valve, an adjustable seat on the casing for said valve, a friction device carried by the stem and arranged to engage said seat to open said valve, a weighted handle to return the friction device to initial position, and means controlled by heat from the pilot light for sustaining the starting valve in open position for automatically closing said valve.

10. In a water heater, the combination of an intermittently and automatically operated main burner and a relatively continuously lighted pilot burner, gas supply pipes to said burners, a starting valve in the gas supply pipe to the pilot burner, a stem for said valve, an adjustable seat on the casing of said valve, a friction device connected to said stem and adapted to engage said seat, a weighted handle for operating said friction device and adapted to return the same to initial position, an expansion and contraction tube normally subjected to heat from the pilot light and adapted to contract when said heat is reduced beyond a predetermined degree, and a two-arm lever engaged with said stem and said tube whereby said starting valve is held open when said tube is expanded and automatically closed when said tube contracts.

11. In a water heater, the combination of an intermittently and automatically operated main burner and a relatively continuously lighted pilot burner, means for supplying gas thereto, and means for automatically shutting off the gas supply from the pilot burner, said means comprising a valve, a stem on the valve, an expansion and contraction tube, a pipe having one end arranged above the pilot burner and its other end discharging into said tube to convey the heat from the pilot burner to the tube, and a lever engaged with said stem and adapted to be operated by the contraction of said tube when the heat is reduced beyond a predetermined degree to close said valve.

12. In a water heater, the combination of an intermittently and automatically operated main burner and a relatively continuously lighted pilot burner, means for supplying gas thereto, and means for automatically shutting off the gas supply from the pilot burner, said means comprising a valve, an expansion and contraction tube normally expanded by heat from the pilot light and adapted to contract when said heat is reduced beyond a predetermined degree, an adjustable collar on said tube, and a lever engaged with said collar and adapted to be operated by the contraction of said tube to close said valve.

13. In a water heater, the combination of a continuously operated pilot burner, a gas supply pipe thereto, a valve in said pipe, an intermittently and automatically operated main burner, a gas supply pipe to the main burner, a valve in said pipe to the main burner, a thermostat, levers operated by the thermostat and holding the valve in the pipe to the main burner normally open, a tube normally expanded by heat from the pilot light and adapted to contract when said heat is reduced beyond a predetermined degree, means adapted to be operated by the contraction of said tube to close said pilot burner gas valve and release said thermostat levers, and a spring for closing said valve in the main burner gas pipe.

14. In a water heater, the combination of an intermittently and automatically operated main burner and a relatively continuously lighted pilot burner, gas supply pipes to said burners, means for automatically shutting off the gas supply from said burners, said means comprising a valve in each supply pipe, an expansion and contraction tube, a pipe to convey the heat from above the pilot light to said tube, and means operated by said tube to close said valves.

15. In a water heater, the combination of an intermittently and automatically operated main burner, a relatively continuously lighted pilot burner, means for supplying gas to said main burner, means for supplying gas to said pilot burner, a starting valve located in the means for supplying gas to the pilot burner, a spring-pressed valve in said main burner supply means, thermostatic means comprising a normally non-compressible member for controlling the operation of said valve, and means for compressing said member to permit the operation of said spring-pressed valve independent of said controlling means, and positively closing said starting valve.

16. In a water heater, the combination of an intermittently and automatically operated main burner, a relatively continuously lighted pilot burner, a gas supply pipe to said burners, a spring-pressed valve in said supply pipe, a thermostat normally controlling the operation of said valve and comprising a longitudinally yieldable negative lever, said negative lever being non-yielding in the normal operation of the thermostat, and means independent of the thermostat for causing said negative lever to yield to permit the operation of said valve independent of the thermostat.

17. In a water heater, the combination of a main burner and a pilot burner, gas supply pipes to said burners, a spring-pressed valve in the supply pipe to the main burner, a thermostat normally controlling the operation of said valve and comprising a longitudinally yieldable negative lever, said negative lever being non-yielding in the normal operation of the thermostat, an expansion and contraction tube normally expanded by heat from the pilot light and adapted to contract when said heat is reduced beyond a predetermined degree, and means actuated by said tube when it contracts for causing said negative lever to yield and permit the operation of said valve independent of the thermostat.

18. In a water heater, the combination of a pilot burner, a main burner, a supply of gas to the burners, a thermostat comprising a negative lever, a pair of levers operated by said thermostat and holding said valve normally open, a spring interposed between said valve and one of said thermostat levers, a yielding section at one end of said negative lever engaged with one of said thermostat levers, said section being rigid in the normal operation of the thermostat, and means normally expanded by heat from the pilot light and adapted to operate by contraction when the heat is reduced beyond a predetermined degree to actuate said thermostat levers by compressing the yielding section of the negative lever and permitting said spring to close said valve in the main burner gas supply.

IRA J. O'MALLEY.

Witnesses:
 WM. O. BELT,
 M. A. KIDDER.